(No Model.)
R. M. OLIVER.
HEATER FOR WATERING TROUGHS.
No. 538,117. Patented Apr. 23, 1895.
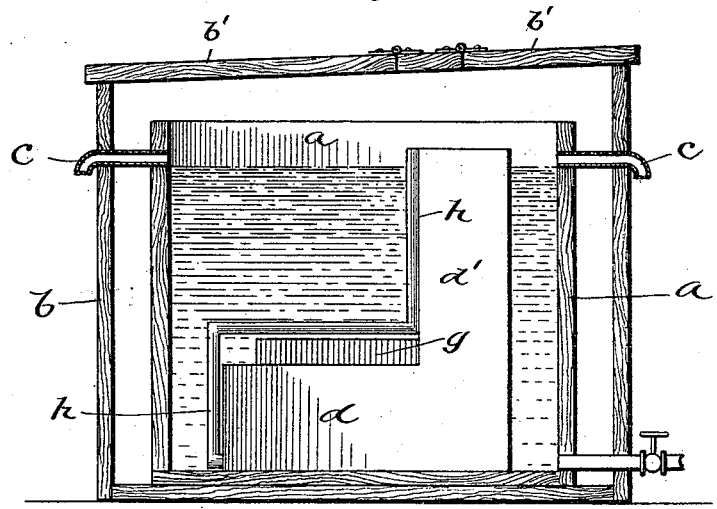
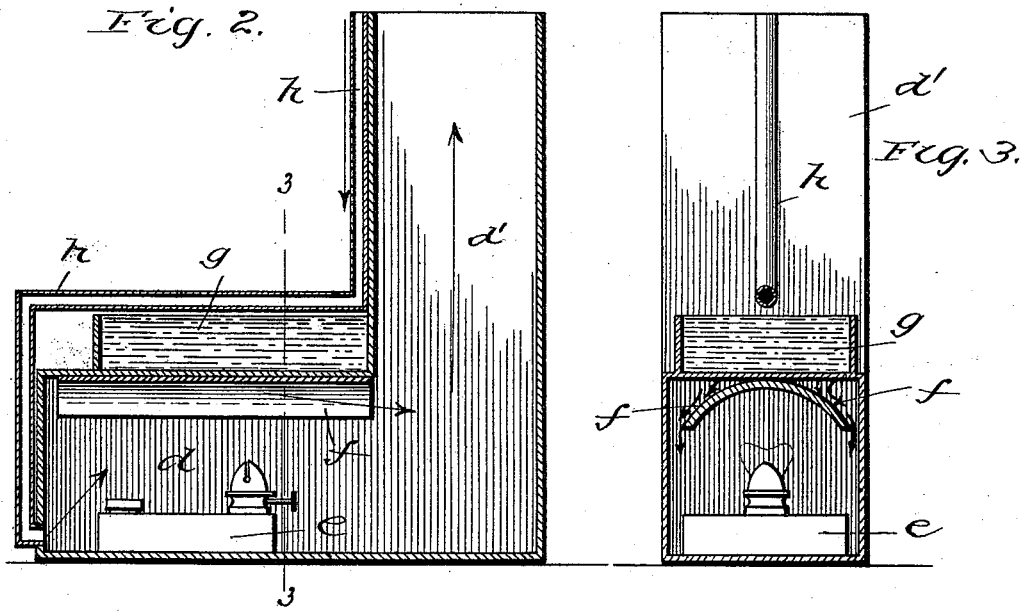
Witnesses
Inventor
Robert M. Oliver
By Alexander Davis
Attorneys

UNITED STATES PATENT OFFICE.

ROBERT M. OLIVER, OF FREEDOM, MAINE.

HEATER FOR WATERING-TROUGHS.

SPECIFICATION forming part of Letters Patent No. 538,117, dated April 23, 1895.

Application filed February 1, 1895. Serial No. 536,987. (No model.)

*To all whom it may concern:*

Be it known that I, ROBERT M. OLIVER, a citizen of the United States, residing at Freedom, in the county of Waldo and State of Maine, have invented certain new and useful Improvements in Heaters for Watering-Troughs, of which the following is a specification, reference being had therein to the accompanying drawings.

This invention relates to that class of water heaters which are adapted to be immersed in the watering trough; and the object of the present device is to produce a strong and simple structure that will keep the water at a uniform temperature with but a minimum expenditure of fuel, as more fully hereinafter set forth.

Figure 1 is a vertical section of a watering trough with my heater placed therein. Fig. 2 is a vertical longitudinal section of the heater detached; and Fig. 3, a transverse vertical section taken on the line 3 3 of Fig. 2.

The trough $a$ is entirely inclosed within a box or casing $b$, a suitable space being left between the sides of the trough and the casing walls and also over the top of the trough to permit the circulation of warm air from the heater. The casing is provided with a hinged cover $b'$, $b'$, which is adapted to be raised when filling the trough or permitting the animals to drink. Suitable over-flow pipes $c$ extend from the trough out through the casing, and a supply pipe $c'$ may extend through the casing into the trough, if desired.

The heater consists of a sheet-metal casing forming a horizontal combustion chamber $d$ and a vertical flue $d'$ extending up from one end of the chamber $d$ to a point above the level of the water. A suitable lamp $e$ is placed in the combustion chamber $d$, and over the lamp, to the upper wall of the combustion chamber, is secured the curved plate $f$, which is adapted to receive the water of condensation that collects on the inner side of the top of the combustion chamber and convey it toward the sides of the chamber and deposit it on either side of the lamp, thereby protecting the lamp from drippings. This plate is secured to the top of the chamber along its longitudinal center and its edges curve in opposite directions downwardly toward the respective sides of the chamber, as shown in Fig. 3. As will be seen the condensed vapor as it collects upon the top of the combustion chamber drips onto the convex side of the plate and is conveyed to one side away from the lamp burner. Formed on or secured to the top of the combustion chamber and extending from the flue to near the end of the combustion chamber is a pan $g$ which is adapted to retain sufficient water over the combustion chamber to prevent the flame from burning out the same in case the water in the trough falls below the top of the combustion chamber. A tube $h$ connects to the lower part of the combustion chamber and is carried up horizontally over the pan $g$ to the flue and then up to the upper end of the same.

To heat the water in a trough, it is simply necessary to place the heater in the trough and then light the lamp and pass it down the chamber $d'$ and pass it back in the horizontal chamber, being careful that the flame is of the proper size to avoid smoking. The heated air and gases will ascend the vertical chamber and fresh air will be drawn down the tube $h$ into the combustion chamber, thereby keeping up a circulation of the heated air and gases. The small amount of fresh air required to support combustion will be drawn in through the overflow tubes or through crevices between the covers and the casing or otherwise let in.

The object in carrying the tube $h$ over the pan is to serve as a nose-guard for the same and prevent the animals drinking the water from the pan, thereby insuring a supply of water in the pan at all times.

Having thus fully described my invention, what I claim is—

1. A water heater for troughs, consisting of a horizontal combustion chamber and a vertical heating flue connected thereto, and a pan on top of said combustion chamber, and a guard extending over said pan, substantially as described.

2. In a water heater the combination of a horizontal combustion chamber, a vertical heating flue connected to said combustion chamber, a pan on said combustion chamber, and an air tube extending from the combustion chamber up and over the pan, forming a guard therefor, and thence extending up to near the top of the flue, substantially as described.

3. A water heater for troughs, consisting of a horizontal combustion chamber, a vertical heating flue connected thereto, a pan on top of the combustion chamber, a deflector plate secured centrally to the under side of the top of the combustion chamber directly beneath the pan and curving downwardly toward the sides of the chamber, and an air tube connected to the combustion chamber, in combination with a heating device directly beneath said deflector in the combustion chamber, substantially as described and for the purpose set forth.

In testimony whereof I affix my signature in presence of two witnesses.

ROBERT M. OLIVER.

Witnesses:
FRANK PENNEY,
HOWARD F. MASON.